June 22, 1937.   S. A. MOSS   2,084,863
SUPERCHARGER
Filed June 28, 1934
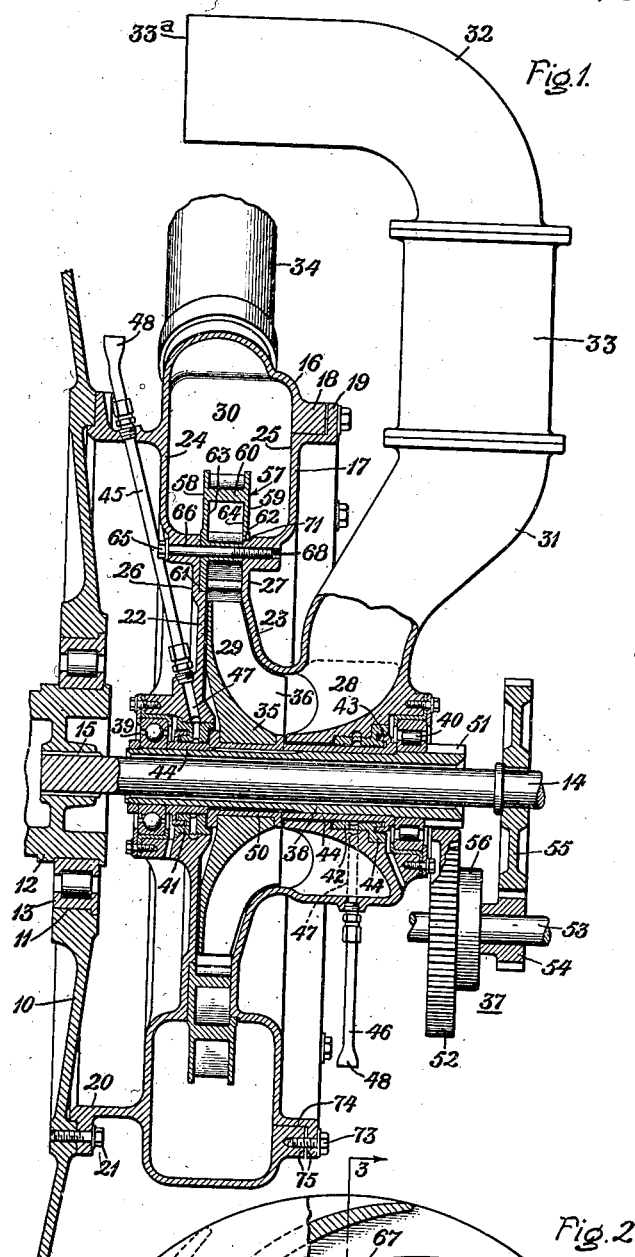
Inventor:
Sanford A. Moss,
by Harry E. Dunham
His Attorney.

Patented June 22, 1937

2,084,863

UNITED STATES PATENT OFFICE 2,084,863

SUPERCHARGER

Sanford A. Moss, Lynn, Mass., assignor to General Electric Company, a corporation of New York Application June 28, 1934, Serial No. 732,789

2 Claims. (Cl. 230—127)

The present invention relates to internal combustion engines with superchargers of the centrifugal compressor type which are driven from and form a part of the engine and which are driven through suitable gearing from the engine crank shaft. The invention is well adapted for use in airplane engines although it is not limited to such use necessarily.

In connection with the operation of supercharged internal combustion engines, it is desired often to provide the engine with different amounts of supercharging. This is accomplished by changing the ratio of the gearing between the engine crank shaft and the impeller of the supercharger so as to operate the impeller at different speeds. In doing this, however, the difficulty is met with that, due to the inherent characteristics of a centrifugal compressor, the compressor is not used always at its best efficiency. A centrifugal compressor comprises an impeller which receives air at its central portion and discharges it at its periphery to a diffuser in which velocity of the air is converted into pressure. A diffuser designed for use with an impeller operated at one speed is not equally efficient when the impeller is operated at another speed. Accordingly, it is desirable, when in connection with a particular engine, a different gear ratio is adopted, to provide a diffuser suited to the new operating conditions. However, with the centrifugal compressor built in and forming a part of an internal combustion engine, it has not been possible, in constructions used prior to my invention, to change the diffuser when a different gear ratio was adopted without having to change expensive engine castings, a thing often not practicable.

The object of my invention is to provide an improved construction and arrangement of directly-driven centrifugal compressors wherein the diffuser may be changed readily and without having to make expensive engine castings. For a consideration of what I believe to be novel and my invention, attention is directed to the following specification and the claims appended thereto.

In the drawing, Fig. 1 is a sectional view of an internal combustion engine provided with a directly-driven supercharger embodying my invention; Fig. 2 is a side view, partly broken away, of the diffuser shown in Fig. 1, and Fig. 3 is an enlarged sectional view along line 3—3 of Fig. 2.

The arrangement illustrated in the drawing comprises an internal combustion engine having an engine or crank casing wall 10 with an opening 11 in which a crank or engine shaft 12 is supported by a roller bearing 13. Other details of the engine proper, such as cylinders, valves, etc., are not shown as they are well known and have no particular bearing on the present invention. A built-in supercharger for supercharging the engine is secured to the crank casing and driven from the crank shaft 12 by means of a shaft 14 connected to the crank shaft by splines 15. The supercharger has a casing comprising two sections 16 and 17 with flanged portions 18 and 19 respectively. The section 16 has an annular flange 20 adjacent the crank casing wall 10 and rigidly secured thereto by a plurality of bolts 21. Each section has an inner wall portion 22 and 23 respectively, an outer wall portion 24 and 25 respectively and an intermediate wall portion 26 and 27 respectively. The intermediate wall portions 26 and 27 usually are integrally united with the corresponding inner and outer wall portions. The inner wall portion 23 forms an annular inlet chamber 28 and the inner wall portions 22 and 23 define an annular impeller chamber 29. The outer wall portions 24 and 25 define an annular compression or outlet chamber 30. Regarding the dimensions of these chambers it will be noted that the mean axial width of the outlet chamber 30 is considerably greater than the axial width of the outlet portion of the impeller chamber 29. The inlet chamber 28 has a flanged conduit portion 31 which is usually connected to an inlet 32. The inlet 32 through the intermediary of a carbureter 33 usually has an opening 33ª which in the case of an airplane engine opens in the direction of airplane travel. The outlet chamber 30 is connected to a conduit or conduits 34 for discharging a mixture of compressed air and fuel to the cylinders (not shown) of the internal combustion engine. An impeller 35 with a plurality of blades 36 is disposed within the impeller chamber 29. The impeller is driven from the shaft 14 through the intermediary of a gearing or gearings 37 and a shaft 38. The latter is concentrically arranged with the shaft 14 and supported by a ball bearing 39 secured to the casing half 16 and a roller bearing 40 secured to the casing half 17. Packings 41 and 42 are arranged adjacent the bearings 39 and 40 respectively to prevent lubricant from leaking into the impeller chamber. Each packing includes a rotatable deflector 43 which has a threaded surface adjacent a plane surface of a cylindrical packing member 44. The deflectors are threaded in a direction to return leakage oil to the bearings. Leakage of lubricant into the impeller chamber is further minimized by the provision of means for maintaining atmospheric pressure in the packing space or spaces, nearest to the impeller chamber. These means include a vent, 45 and 46 respectively, for each packing. One end 47 of each vent communicates with one of the packing spaces and the other end 48 of each vent communicates with the atmosphere. A member 50 of the impeller is rigidly secured to the shaft. The end of the shaft facing away from the crank casing wall 10 is united with a pinion 51 which meshes with a gear 52 on a rotatable shaft 53. A pinion 54 of the gearing 37 is loosely provided on the shaft 53 and meshes with a gear 55 secured to an end portion of the shaft 14. The gearing may also include a suitable slip clutch 56 diagrammatically indicated in the drawing between the pinion 54 and the gear 52, which clutch is arranged to slip in the case of overload on the gearing. With this arrangement the shaft 38 for rotating the propeller is rotated at a definite speed ratio in response to the rotation of the shaft 14. During operation the rotation of the impeller creates a low pressure in the inlet chamber whereby air enters the inlet 32. The air mixes with fuel in the carbureter, whence the mixture or medium of air and fuel passes through the inlet chamber 28 into the impeller chamber 29. The rotating impeller blades 36 add energy so that the mixture is discharged from the impeller chamber at high velocity.

A diffuser 57 is provided at the outlet portion of the impeller chamber for converting velocity energy of the impelled mixture or medium into pressure energy, and discharging the compressed mixture or medium into the discharge chamber 30. The diffuser in accordance with my invention is provided as a separate, detachable element. It comprises side walls 58 and 59 which are integrally united with a plurality of vanes 60. The intermediate wall portions 26 and 27 of the two casing halves are provided with recesses forming seats or seating surfaces 61 and 62 respectively for the side walls 58 and 59 of the diffuser. An inner annular portion of the side wall 58 of the diffuser is seated on the seating surface 61 and an inner portion of the side wall 59 is seated on the seat 62 of the intermediate wall portion 27. The arrangement is such that the inner surfaces 63 and 64 of the side walls 58 and 59 form smooth continuations of the inner surfaces of the inner and intermediate wall portions 22, 23, 26 and 27.

An outer annular portion of the diffuser is disposed within or projects into the outlet chamber 30. The diffuser is rigidly held on the seating surfaces of said intermediate portions by a plurality of detachable connecting means, in the present instance shown as a plurality of bolts 65. Each bolt projects into a bore 66 in the casing section 16, a bore 67 in the side wall 58 and a vane 60 of the diffuser, and a threaded bore 68 in the casing section 17. The bolts 65 have a loose fit in the bores 66 and 67 of the intermediate casing wall portion 27 and the vanes 60 respectively. The bolts 65 secure the diffuser to the supercharger casing and at the same time they unite the two casing sections 16 and 17 by forcing the adjacent surfaces of the flanged portions 18 and 19 towards each other. It is noted that the outer surface 70 of the diffuser side wall 59 (Fig. 3) is spaced from a shoulder 71 formed at the end of the seating surface 62. Tightening of the bolts 65 causes the shoulder 71 to be drawn towards the surface 70 until a tight fit is attained between the edges 72 (Fig. 3) of the vanes and the inner surface of the intermediate wall portion 27. The flanges 18 and 19 of the two casing sections are united by additional bolts 73. Tightening of the bolts 73 causes cylindrical surfaces 75 of the flanges to engage each other. Thus, the two sections of the casing firmly close the joint defined by the flanges 18 and 19. The fastening together of the flanged casing sections represents an additional means for firmly holding the diffuser between the two casing sections, which in certain cases permits the omission of the bolts 65. The provision of a diffuser as a detachable element in built-in superchargers of combustion engines has a distinct advantage in that it increases to a considerable extent the adaptability of such arrangements to different operating conditions. For example, in the case where an airplane engine has to be rebuilt for a different use, such as normal flying at higher or lower altitude, all that is necessary is to replace the gearing 37 by a gearing with a different ratio and at the same time replace the diffuser by a diffuser with a different vane arrangement whereby the supercharger may be operated at maximum efficiency with the new gear ratio. More specifically, if in an airplane engine with built-in supercharger the gear ratio and diffuser are such as to give the desired amount of supercharging at maximum efficiency under normal flying condition at an altitude of 3000 feet, such engine can be easily adapted to flying condition at 10,000 feet altitude by replacing the gearing and the diffuser to obtain the desired relatively greater supercharging effect at maximum efficiency at the altitude of 10,000 feet. With my improved arrangement it is no longer necessary to replace the entire supercharger or the engine in order to render an airplane adaptable to a different normal operating condition.

What I claim as new and desire to secure by Letters Patent of the United States, is:

1. In a supercharger for internal combustion engines, the combination of a casing having inner wall portions defining an inlet chamber and an impeller chamber, outer wall portions defining an outlet chamber, and intermediate wall portions secured to the inner and outer wall portions and defining a seat for a diffuser, a shaft, an impeller with a plurality of blades being disposed within the impeller chamber and secured to the shaft, a diffuser having a side wall and a plurality of vanes integrally united with the side wall, the diffuser side wall being seated on said seat, and means for detachably securing the diffuser to said intermediate wall portions comprising a plurality of bolts, each bolt projecting through a bore in at least one of the intermediate walls and one vane.

2. In a supercharger for internal combustion engines, the combination of a casing comprising two sections defining an impeller chamber and an outlet chamber, means for conducting a fluid to the impeller chamber, a shaft, an impeller disposed in the impeller chamber and secured to the shaft, a detachable diffuser intermediate said chambers comprising a plurality of vanes for converting the velocity energy of an impelled fluid into pressure energy and discharging the converted fluid into the outlet chamber, and means for uniting the two casing sections and the diffuser comprising a plurality of bolts, each bolt projecting through bores in the two casing sections and a diffuser vane.

SANFORD A. MOSS.